(12) United States Patent
Zhao et al.

(10) Patent No.: US 12,225,207 B2
(45) Date of Patent: Feb. 11, 2025

(54) SUBBLOCK INTRA AND INTER CODING

(71) Applicant: Tencent America LLC, Palo Alto, CA (US)

(72) Inventors: Xin Zhao, Santa Clara, CA (US); Guichun Li, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 53 days.

(21) Appl. No.: 18/207,578

(22) Filed: Jun. 8, 2023

(65) Prior Publication Data

US 2024/0015305 A1 Jan. 11, 2024

Related U.S. Application Data

(60) Provisional application No. 63/359,155, filed on Jul. 7, 2022.

(51) Int. Cl.
*H04N 19/159* (2014.01)
*H04N 19/103* (2014.01)
(Continued)

(52) U.S. Cl.
CPC ......... *H04N 19/159* (2014.11); *H04N 19/103* (2014.11); *H04N 19/129* (2014.11);
(Continued)

(58) Field of Classification Search
CPC .. H04N 19/159; H04N 19/103; H04N 19/129; H04N 19/172; H04N 19/176; H04N 19/186; H04N 19/52; H04N 19/593; H04N 19/60; H04N 19/70; H04N 19/119; H04N 19/105; H04N 19/109; H04N 19/11; H04N 19/513; H04N 19/54
(Continued)

(56) References Cited

U.S. PATENT DOCUMENTS

| | | | |
|---|---|---|---|
| 9,420,293 B2 * | 8/2016 | Song | H04N 19/61 |
| 11,706,437 B2 * | 7/2023 | Misra | H04N 19/52 |
| | | | 375/240.26 |
| 11,831,816 B2 * | 11/2023 | Wang | H04N 19/159 |

OTHER PUBLICATIONS

High Efficiency Video Coding, Rec. ITU-T H.265 v4 Dec. 2016, pp. 1-664.

(Continued)

*Primary Examiner* — Susan E. Torgerson
(74) *Attorney, Agent, or Firm* — ArentFox Schiff LLP

(57) ABSTRACT

Processing circuitry receives a coded bitstream carrying at least a picture, determines that a current coding unit (CU) in the picture is coded in a subblock based inter prediction mode based on a first syntax element value in the coded bitstream, and determines that one or more first subblocks in the current CU that is coded in the subblock based inter prediction mode are coded by intra prediction. The processing circuitry reconstructs one or more second subblocks of the current CU by inter prediction based on the subblock based inter prediction mode, the one or more second subblocks do not overlap with the one or more first subblocks in the current CU. The processing circuitry reconstructs the one or more first subblocks of the current CU by the intra prediction while the current CU is coded in the subblock based inter prediction mode.

20 Claims, 16 Drawing Sheets

(51) Int. Cl.
*H04N 19/129* (2014.01)
*H04N 19/172* (2014.01)
*H04N 19/176* (2014.01)
*H04N 19/186* (2014.01)
*H04N 19/52* (2014.01)
*H04N 19/593* (2014.01)
*H04N 19/60* (2014.01)
*H04N 19/70* (2014.01)

(52) U.S. Cl.
CPC ......... *H04N 19/172* (2014.11); *H04N 19/176* (2014.11); *H04N 19/186* (2014.11); *H04N 19/52* (2014.11); *H04N 19/593* (2014.11); *H04N 19/60* (2014.11); *H04N 19/70* (2014.11)

(58) Field of Classification Search
USPC ........................................................ 375/240
See application file for complete search history.

(56) References Cited

OTHER PUBLICATIONS

ITU-T and ISO/IEC, "Versatile Video Coding", ITU-T Rec. H.266 and ISO/IEC 23090-3, 2020, pp. 1-516.

H. Yang, H. Chen, J. Chen, S. Esenlik, S. Sethuraman, X. Xiu, E. Alshina, and J. Luo, "Subblock-Based Motion Derivation and Inter Prediction Refinement in Versatile Video Coding Standard", IEEE Trans. Circuits Syst. Video Technol., vol. 31, No. 10, pp. 3862-3877, Oct. 2021.

M. Coban, et al., "Algorithm description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

\* cited by examiner

SUBBLOCK INTRA AND INTER CODING

INCORPORATION BY REFERENCE

The present disclosure claims the benefit of priority to U.S. Provisional Application No. 63/359,155, "Subblock Intra and Inter Coding" filed on Jul. 7, 2022. The entire disclosure of the prior application is hereby incorporated by reference in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video files across different devices, storage and networks with minimal quality degradation. In some examples, video codec technology can compress video based on spatial and temporal redundancy. In an example, a video codec can use techniques referred to as intra prediction that can compress image based on spatial redundancy. For example, the intra prediction can use reference data from the current picture under reconstruction for sample prediction. In another example, a video codec can use techniques referred to as inter prediction that can compress image based on temporal redundancy. For example, the inter prediction can predict samples in a current picture from previously reconstructed picture with motion compensation. The motion compensation is generally indicated by a motion vector (MV).

SUMMARY

Aspects of the disclosure provide methods and apparatuses for video encoding/decoding. In some examples, an apparatus for video decoding includes processing circuitry. The processing circuitry receives a coded bitstream carrying at least a picture that includes a block comprising a plurality of subblocks, determines that a current coding unit (CU) in the picture is coded in a subblock based inter prediction mode based on a first syntax element value in the coded bitstream, and determines that one or more first subblocks in the current CU that is coded in the subblock based inter prediction mode are coded by intra prediction. The processing circuitry reconstructs one or more second subblocks of the current CU by inter prediction based on the subblock based inter prediction mode, the one or more second subblocks do not overlap with the one or more first subblocks in the current CU. The processing circuitry reconstructs the one or more first subblocks of the current CU by the intra prediction while the current CU is coded in the subblock based inter prediction mode.

In some examples, the subblock based inter prediction mode includes at least one of an affine mode, a regression based inter prediction mode or a subblock-based temporal motion vector prediction (SbTMVP) mode.

In some examples, a first flag that indicates whether at least one subblock in the current CU is coded by the intra prediction is determined, and then second flags respectively associated with subblocks in the current CU are decoded from the bitstream, a second flag associated with a subblock in the current CU indicates whether the subblock being coded by the intra prediction. In an example, the first flag is decoded from the bitstream.

In some examples, the first flag is derived without signaling. In an example, the first flag is derived of a true value in response to a determination that a collocated block for a subblock in the current CU has no valid motion vector when the current CU is coded in a subblock-based temporal motion vector prediction (SbTMVP) mode. In another example, the first flag is derived of a false value in response to a determination that each subblock in the current CU has a valid motion vector when the current CU is coded in the SbTMVP mode.

In some examples, the one or more second subblocks of the current CU are reconstructed before the one or more first subblocks of the current CU, and the one or more first subblocks of the current CU are reconstructed following a specific order that is determined based on positions of the one or more second subblocks.

In an example, the one or more second subblocks of the current CU are reconstructed according to a raster scanning order, and the one or more first subblocks of the current CU are reconstructed according to the raster scanning order after the one or more second subblocks being reconstructed.

In some examples, for a first subblock in the one or more first subblocks, the first subblock is predicted according to neighboring inter coded subblocks and neighboring intra coded subblocks in the current CU that are reconstructed.

In an example, a transform unit size is determined to be a size of subblocks in response to a first flag being true, the first flag indicates whether at least one subblock in the current CU is coded by the intra prediction. In another example, the transform unit size is determined to be a size of the current CU in response to the first flag being false.

In some examples, an inverse transform is performed to obtain a transform unit of a size of the current CU, residual values corresponding to the one or more second subblocks are determined according to the transform unit. Then, predicted one or more second subblocks based on inter prediction and the residual values are combined for the reconstruction of the one or more second subblocks.

In some examples, inverse transforms are obtained to obtain one or more transform units of a size of a subblock in the current CU, the one or more transform units respectively correspond to the one or more first subblocks. Residual values corresponding to the one or more first subblocks are determined according to the one or more transform units. Then, the predicted one or more first subblocks based on intra prediction and the residual values are combined for the reconstruction of the one or more first subblocks.

In some examples, a first subblock in the one or more first subblocks is reconstructed based on an intra prediction mode that is selected from at least one of a set of most portable modes, as a set of selected smooth modes or a set of non-directional modes.

In some examples, a first subblock in the one or more first subblocks is reconstructed according to at least one of one or more right columns, one or more bottom rows, one or more corner samples, one or more above right rows, or one or more bottom left columns.

In some examples, for each subblock in the one or more first subblocks, a luma component and chroma components of the subblock are both reconstructed by the intra prediction.

In some examples, in response to the one or more first subblocks in the current CU are coded by the intra prediction, the inter prediction is determined with constraints for reconstructing the one or more second subblocks. In an example, uni-prediction is used for the inter prediction.

In some examples, a predictor of an intra prediction mode is determined from a neighboring pixel of the current CU, the intra prediction mode includes at least one of a most probable mode (MPM), a decoder-side intra mode derivation (DIMD) mode, a template based intra mode derivation (TIMD) mode, or a directional intra prediction mode.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
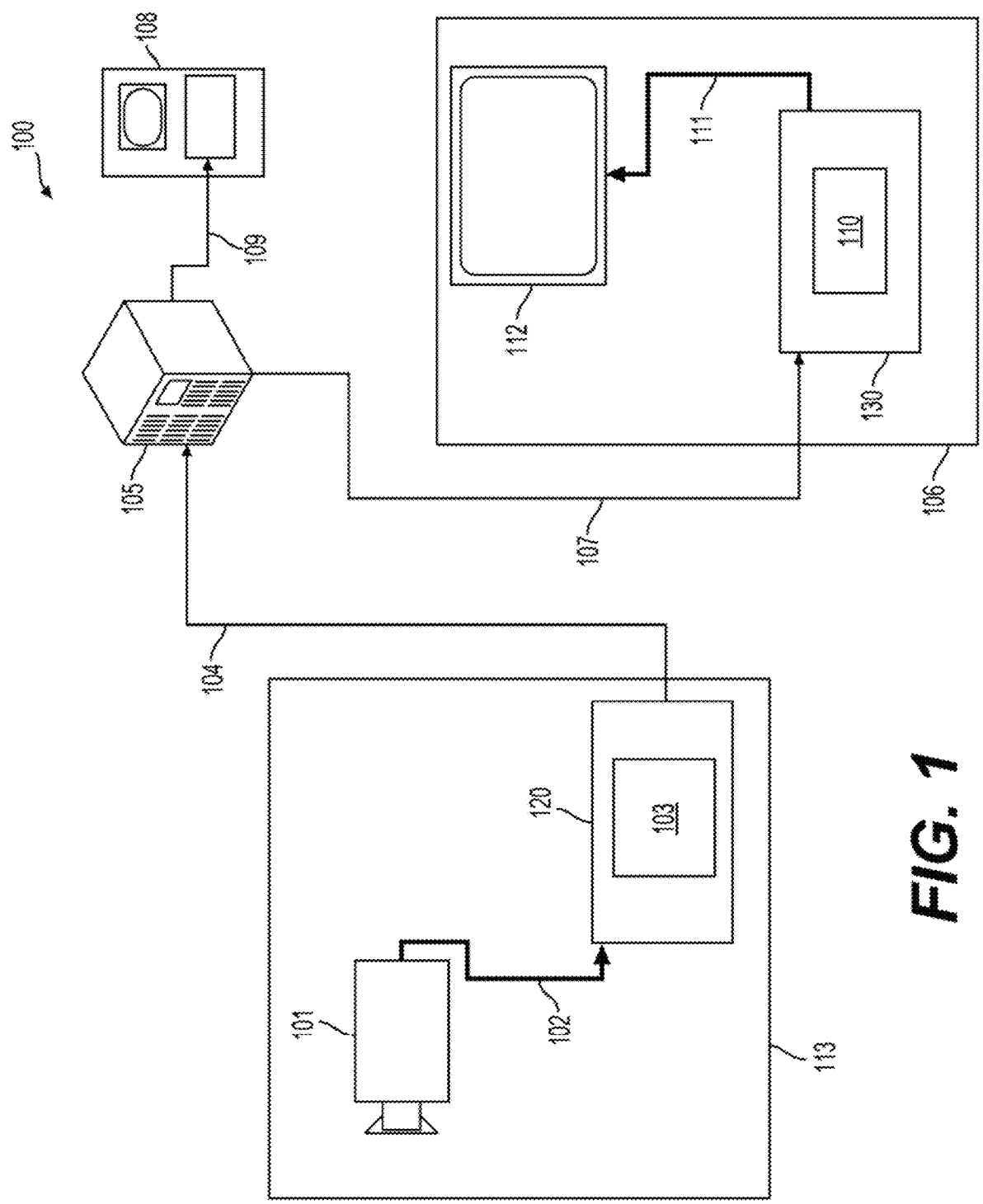
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) include a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
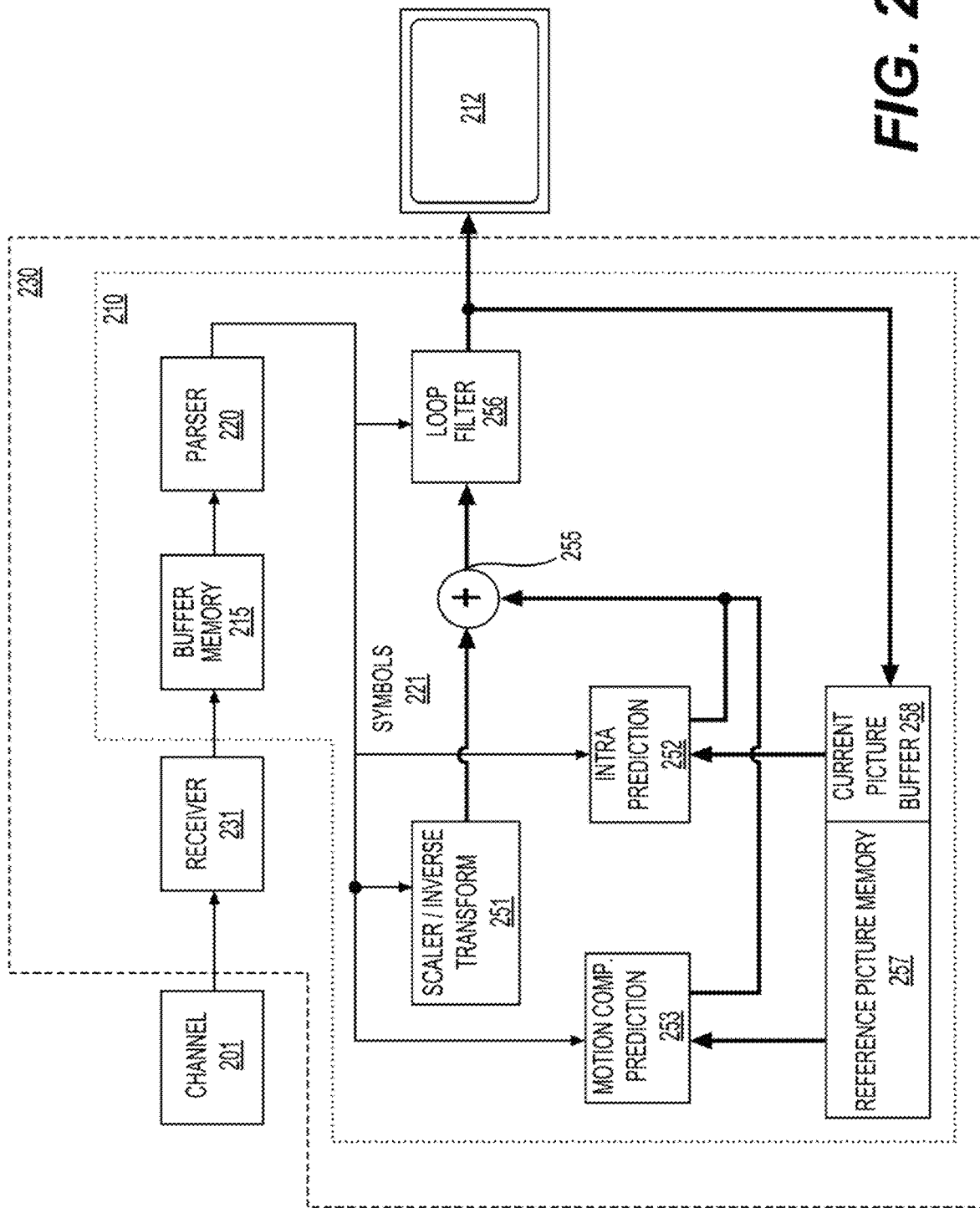
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
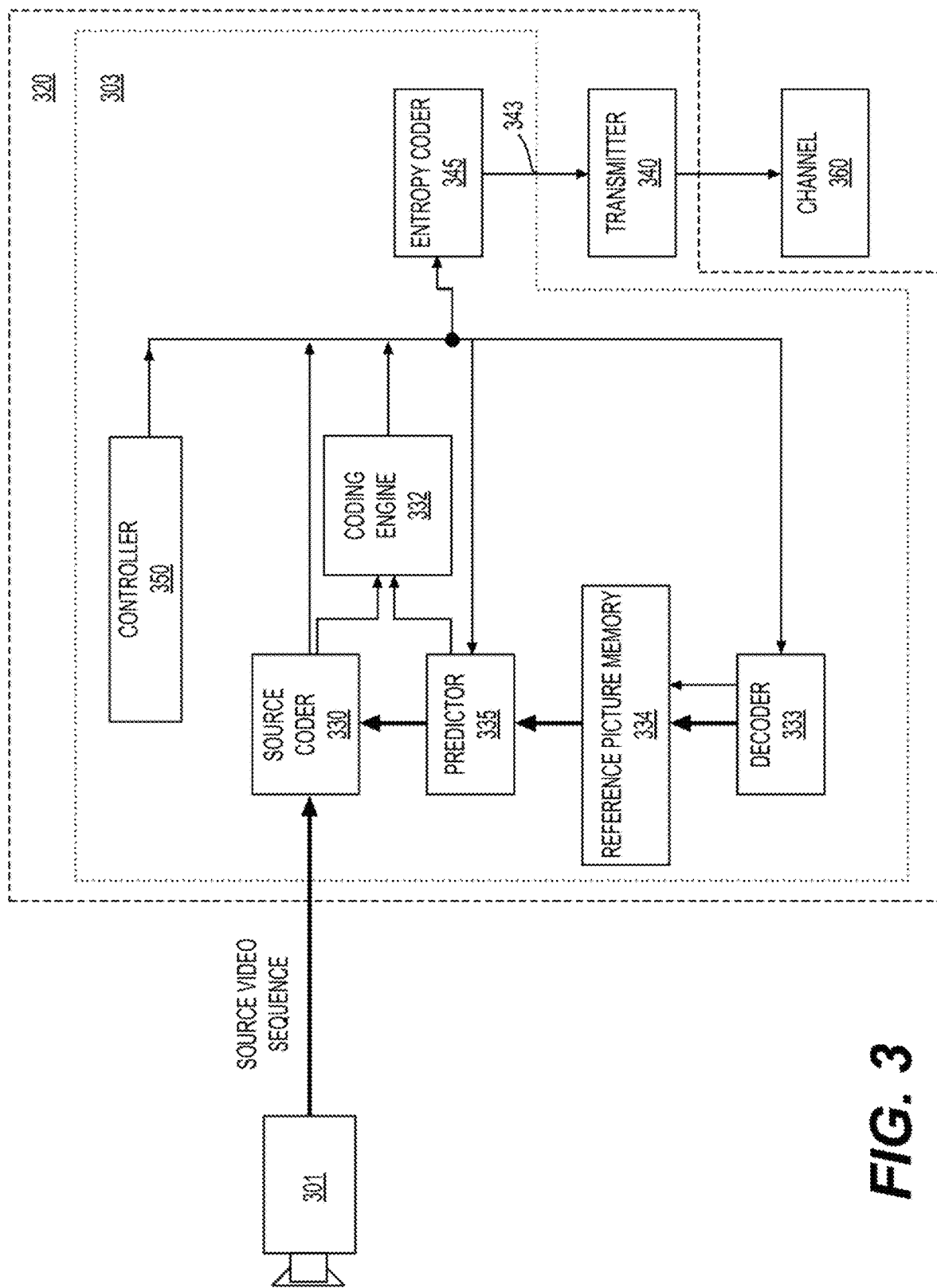
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB) and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for subblock intra and inter coding.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

Figure 4:
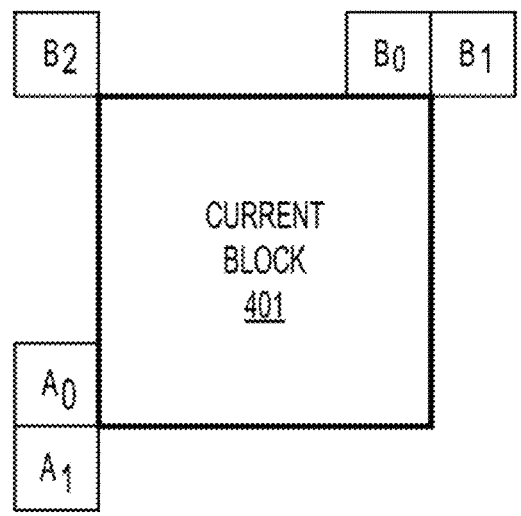
FIG. 4 shows positions of spatial merge candidates according to an embodiment of the disclosure.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

Figure 5:
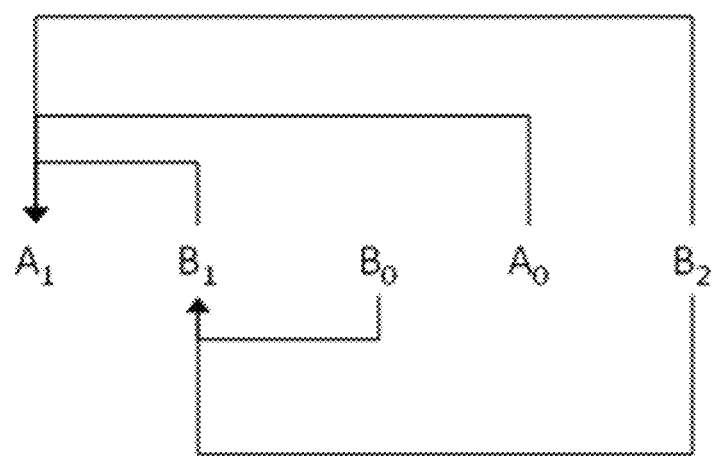
FIG. 5 shows candidate pairs that are considered for a redundancy check of spatial merge candidates according to an embodiment of the disclosure.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 6:
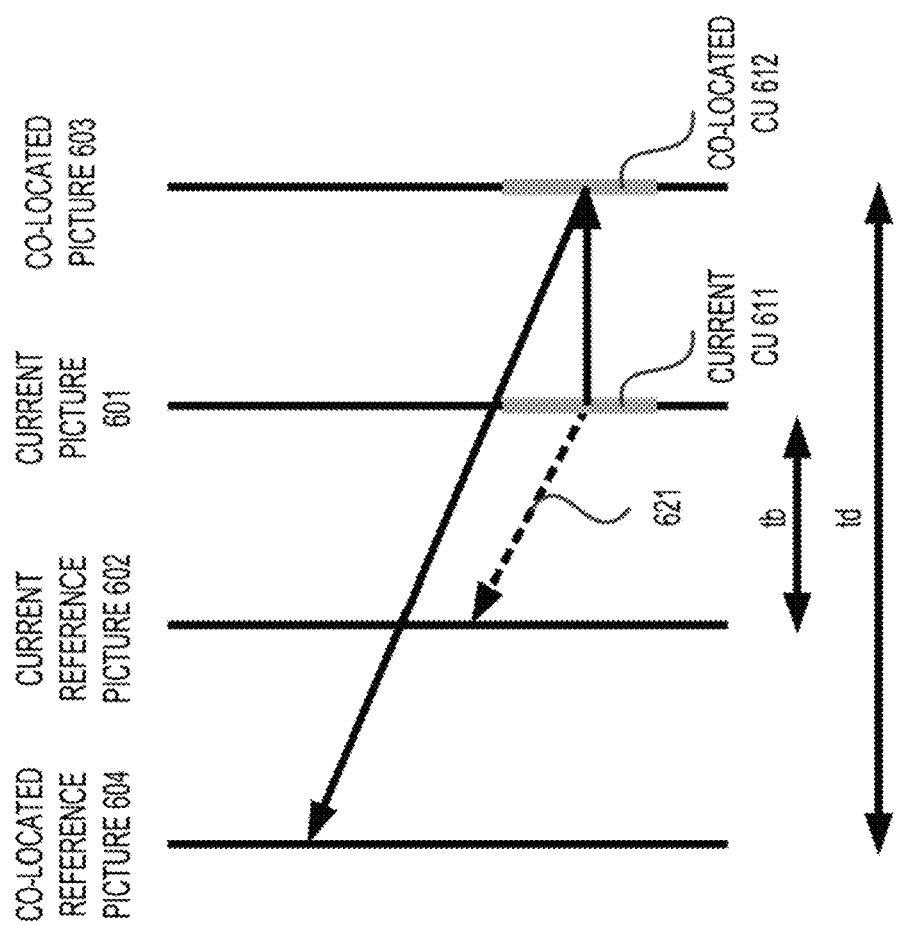
FIG. 6 shows exemplary motion vector scaling for a temporal merge candidate.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611) in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero.

Figure 7:
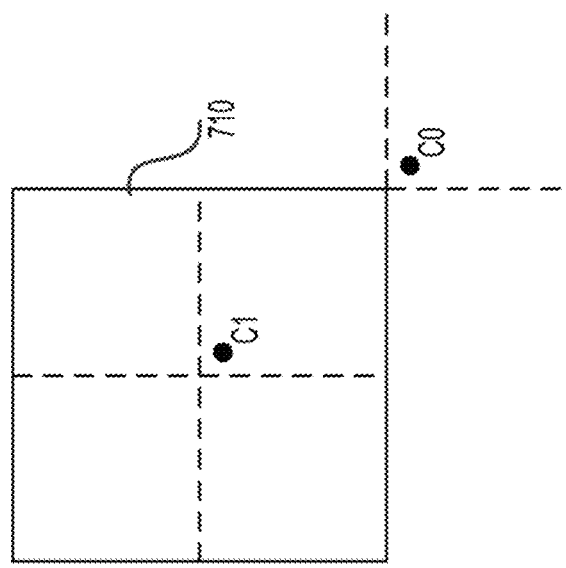
FIG. 7 shows exemplary candidate positions (e.g., C0 and C1) for a temporal merge candidate of a current CU.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

In an embodiment, a merge with motion vector difference (MMVD) mode is used, such as in VVC, where implicitly derived motion information can be used to predict samples of a CU (e.g., a current CU). MMVD mode is used for either skip or merge modes with a motion vector expression method. A MMVD merge flag can be signaled to specify whether the MMVD mode is used for the CU, for example, after signaling a skip flag or a merge flag.

In some examples, MMVD re-uses merge candidate. Among the merge candidates, a candidate can be selected, and is further expanded by the motion vector expression method. MMVD provides motion vector expression with simplified signaling. In some examples, the motion vector expression method includes starting point, motion magnitude, and motion direction.

In some examples (e.g., VVC), MMVD technique can use a merge candidate list to select the candidate for the starting point. However, in an example, only candidates which are default merge type (MRG_TYPE_DEFAULT_N) are considered for MMVD's expansion.

In some examples, a base candidate index is used to define the starting point. The base candidate index indicates the best candidate among candidates in the list as shown in Table 1. For example, the list is a merge candidate list with motion vector predictors (MVP). The base candidate index can indicate the best candidate in the merge candidate list.

TABLE 1

A example of a base candidate index (IDX)

| Base candidate IDX | | | | |
|---|---|---|---|---|
| | 0 | 1 | 2 | 3 |
| $N^{th}$ MVP | $1^{st}$ MVP | $2^{nd}$ MVP | $3^{rd}$ MVP | $4^{th}$ MVP |

It is noted that in an example, the number of base candidate is equal to 1, then base candidate IDX is not signaled.

In the MMVD mode, after a merge candidate (also referred to as an MV basis or an MV starting point) is selected, the merge candidate can be refined by additional information, such as signaled MVD information. The additional information can include an index (such as a distance index, e.g., mmvd_distance_idx[x0][y0]) used to specify a motion magnitude and an index (such as a direction index, e.g., mmvd_direction_idx[x0][y0]) used to indicate a motion direction. In the MMVD mode, one of the first two candidates in the merge list can be selected as an MV basis. For example, a merge candidate flag (e.g., mmvd_cand_flag[x0][y0]) indicates the one of the first two candidates in the merge list. The merge candidate flag can be signaled to indicate (e.g., specify) which one of the first two candidates is selected. The additional information can indicate a MVD (or a motion offset) to the MV basis. For example, the motion magnitude indicates a magnitude of the MVD, the motion direction indicates a direction of the MVD.

Figure 8:
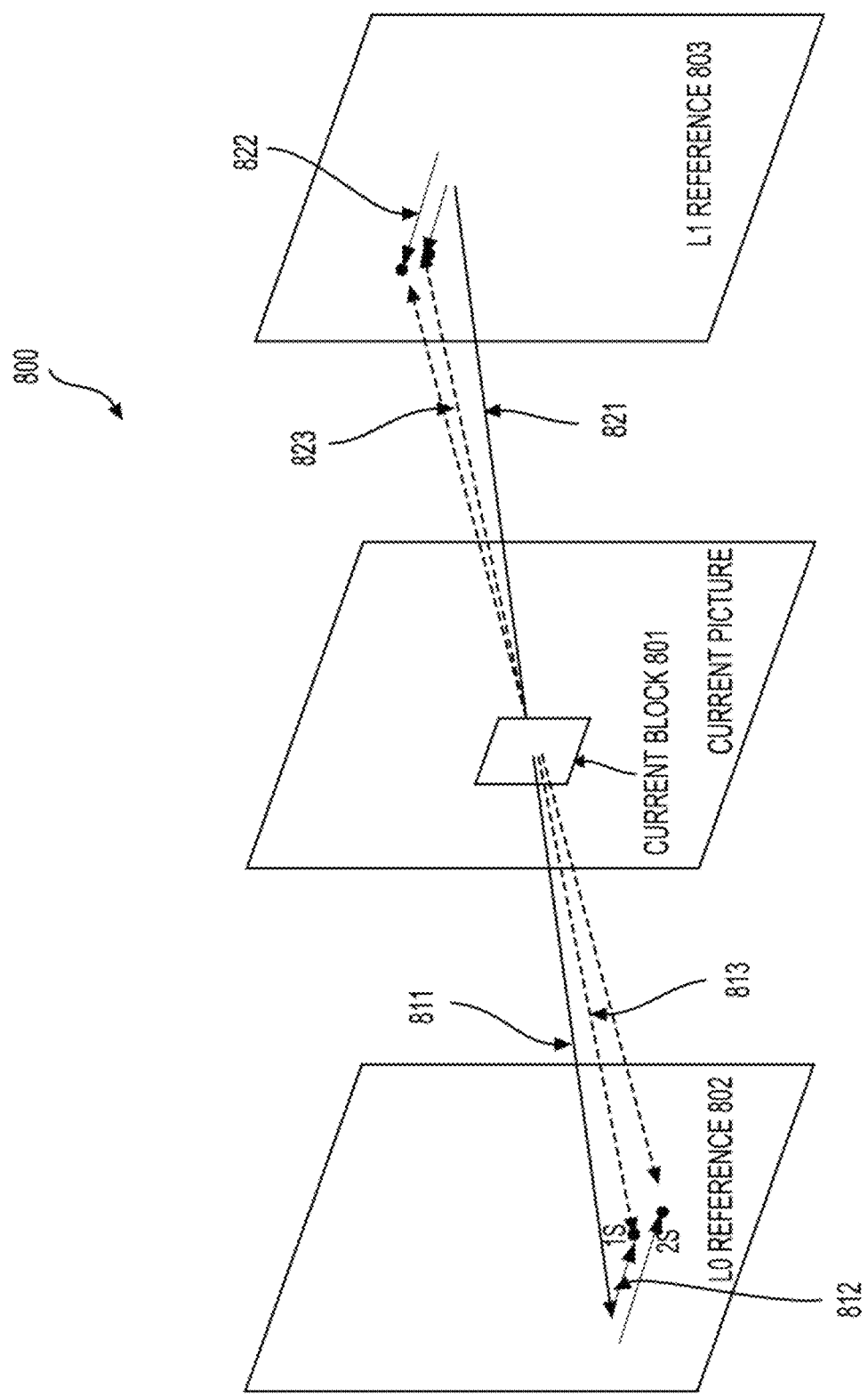
FIG. 8 shows an example of a search process in some examples.

In an example, the merge candidate selected from the merge candidate list is used to provide the starting point or the MV starting point at a reference picture. A motion vector of the current block can be expressed with the starting point and a motion offset (or MVD) including a motion magnitude and a motion direction with respect to the starting point. At an encoder side, selection of the merge candidate and determination of the motion offset can be based on a search process (an evaluation process), such as shown in FIG. 8. At a decoder side, the selected merge candidate and the motion offset can be determined based on signaling from the encoder side.

Figure 9:
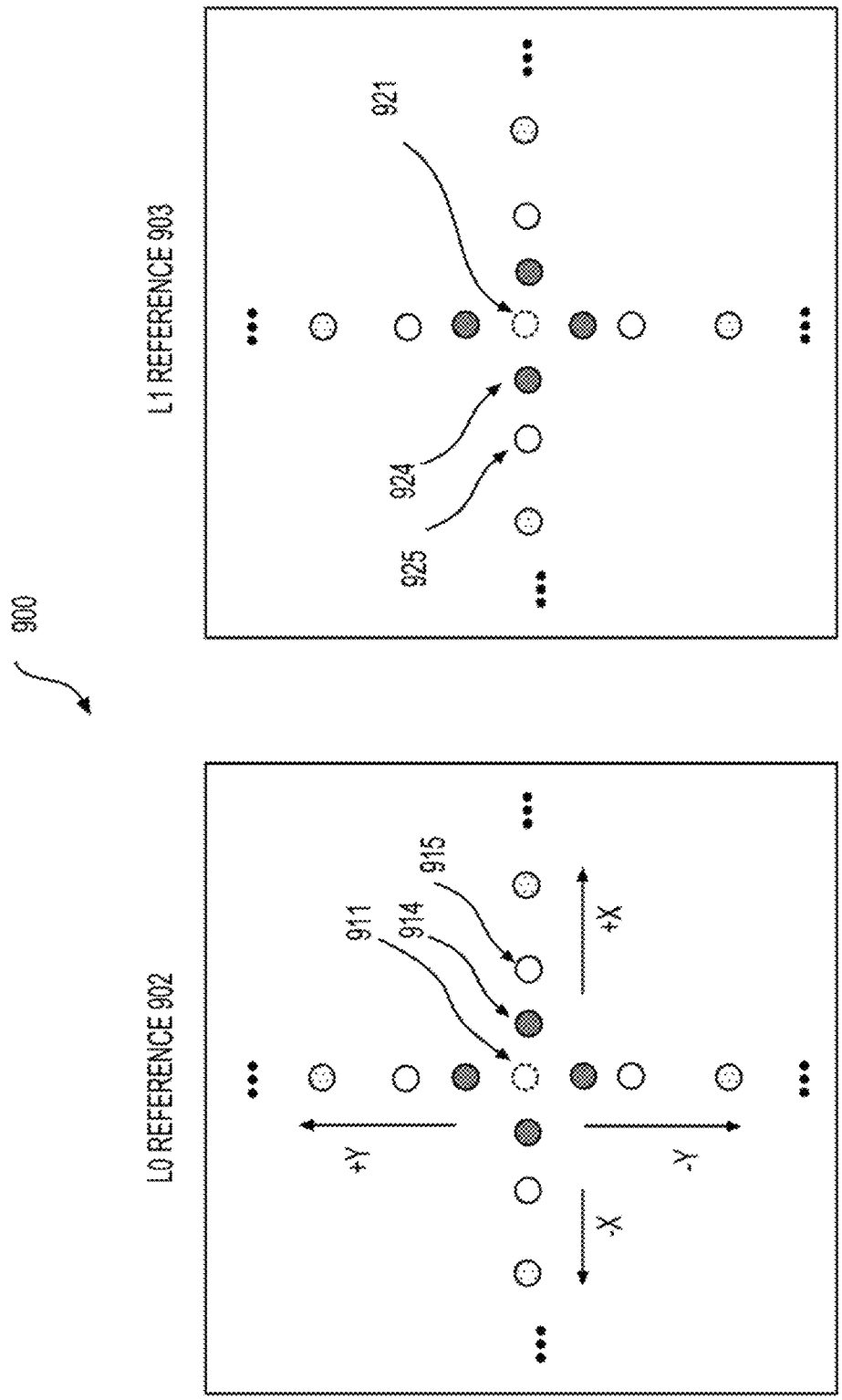
FIG. 9 shows examples of search points in some examples.

FIG. 8 shows an example of a search process (800) in a MMVD mode. FIG. 9 shows examples of search points in a MMVD mode. In some examples, a subset or an entire set of the search points in FIG. 9 are used in the search process (800) in FIG. 8. By performing the search process (800), for example, at the encoder side, the additional information including the merge candidate flag (e.g., mmvd_cand_flag[x0][y0]), the distance index (e.g., mmvd_distance_idx[x0][y0]), and the direction index (e.g., mmvd_direction_idx[x0][y0]) can be determined for a current block (801) in a current picture (or a current frame).

A first motion vector (811) and a second motion vector (821) belonging to a first merge candidate are shown. The first motion vector (811) and the second motion vector (821) are MV starting points used in the search process (800). The first merge candidate can be a merge candidate on a merge candidate list constructed for the current block (801). The first and second motion vectors (811) and (821) can be associated with two reference pictures (802) and (803) in reference picture lists L0 and L1, respectively. Referring to FIGS. 8-9, the first and second motion vectors (811) and (821) can point to two starting points (911) and (921) in the reference pictures (802) and (803), respectively, as shown in FIG. 9.

Referring to FIG. 9, the two starting points (911) and (921) in FIG. 9 can be determined at the reference pictures (802) and (803). In an example, based on the starting points (911) and (921), multiple predefined points extending from the starting points (911) and (921) in vertical directions (represented by +Y, or −Y) or horizontal directions (represented by +X and −X) in the reference pictures (802) and (803) can be evaluated. In one example, a pair of points mirroring each other with respect to the respective starting point (911) or (921), such as the pair of points (914) and (924) (e.g., indicated by a shift of 1S in FIG. 8), or the pair of points (915) and (925) (e.g., indicated by a shift of 2S in FIG. 8), can be used to determine a pair of motion vectors (e.g., MVs (813) and (823) in FIG. 8) which may form a motion vector predictor candidate for the current block (801). The motion vector predictor candidates (e.g., MVs (813) and (823) in FIG. 8) determined based on the predefined points surrounding the starting points (911) or (921) can be evaluated.

The distance index (e.g., mmvd_distance_idx[x0][y0]) can specify motion magnitude information and indicate a pre-defined offset (e.g., 1S or 2S in FIG. 8) from the starting point that is indicated by the merge candidate flag. It is noted that the predefined offset is also referred to as MMVD step in an example.

Referring to FIG. 8, an offset (e.g., a MVD (812) or a MVD (822)) can be applied (e.g., added) to a horizontal component or a vertical component of the starting MV (e.g., the MV (811) or (821)). An exemplary relationship of the distance index (IDX) and the pre-defined offset is specified in Table 2. When a full-pel MMVD is off, for example, a full-pel MMVD flag (e.g., slice_fpel_mmvd_enabled_flag) is equal to 0, a range of MMVD pre-defined offsets can be from ¼ luma samples to 32 luma samples. When the full-pel MMVD is off, the pre-defined offset can have a non-integer value, such as a fraction of a luma sample (e.g., ¼ pixel or ½ pixel). When the full-pel MMVD is on, for example, the full-pel MMVD flag (e.g., slice_fpel_mmvd_enabled_flag) is equal to 1, the range of MMVD pre-defined offsets can be from 1 luma sample to 128 luma samples. In an example, when the full-pel MMVD is on, the pre-defined offset only has an integer value, such as one or more luma samples.

TABLE 2

An exemplary relationship of a distance index and an offset (e.g., a pre-defined offset)

| | Distance IDX | | | | | | | |
|---|---|---|---|---|---|---|---|---|
| | 0 | 1 | 2 | 3 | 4 | 5 | 6 | 7 |
| Offset (in unit of luma sample) Full-pel MMVD off | ¼ | ½ | 1 | 2 | 4 | 8 | 16 | 32 |
| Offset (in unit of luma sample) Full-pel MMVD on | 1 | 2 | 4 | 8 | 16 | 32 | 64 | 128 |

The direction index can represent a direction (or a motion direction) of the MVD relative to the starting point. In an example, the direction index represents one of the four directions shown in Table 3. The meaning of MVD sign(s) in Table 3 can vary according to information of starting MV(s). In an example, when the starting MV is a uni-prediction MV or the starting MVs are bi-prediction MVs with both reference lists point to a same side of the current picture (e.g., POCs of two reference pictures are both larger than a POC of the current picture or the POCs of the two reference pictures are both smaller than the POC of the current picture), the MVD sign(s) in Table 3 specifies the sign of the MV offset (or the MVD) that is added to the starting MV.

When the starting MVs are the bi-prediction MVs with the two MVs pointing to different sides of the current picture (e.g., the POC of one reference picture is larger than the POC of the current picture, and the POC of the other reference picture is smaller than the POC of the current picture), the MVD sign in Table 3 specifies the sign of the MV offset (or the MVD) added to the list0 MV component of the starting MV and the MVD sign for the list1 MV has an opposite value. Referring to FIG. 8, the starting MVs (811) and (821) are the bi-prediction MVs with the two MVs (811) and (821) point to different sides of the current picture. The POC of the L1 reference picture (803) is larger than the POC of the current picture, and the POC of the L0 reference picture (802) is smaller than the POC of the current picture. The MVD sign (e.g., the sign "+" for the x-axis) indicated by the direction index (e.g., 00) in Table 2 specifies the sign (e.g., the sign "+" for the x-axis) of the MVD (e.g., the MVD (812)) added to the list0 MV component of the starting MV (e.g., (811)) and the MVD sign of the MVD (822) for the list1 MV component of the starting MV (e.g., (821)) has an opposite value, such as a sign "−" that is opposite to the sign "+" of the MVD (812).

Referring to Table 3, the direction index 00 indicates a positive direction in the x-axis, the direction index 01 indicates a negative direction in the x-axis, the direction index 10 indicates a positive direction in the y-axis, and the direction index 11 indicates a negative direction in the y-axis.

TABLE 3

An exemplary relationship between a sign of an MV offset and a direction index

| Direction IDX | 00 | 01 | 10 | 11 |
|---|---|---|---|---|
| x-axis | + | − | N/A | N/A |
| y-axis | N/A | N/A | + | − |

A syntax element mmvd_merge_flag[x0][y0] can be used to represent the MMVD merge flag of the current CU. In an example, the MMVD merge flag (e.g., mmvd_merge_flag [x0][y0]) equal to 1 specifies that the MMVD mode is used to generate the inter prediction parameters of the current CU. The MMVD merge flag (e.g., mmvd_merge_flag[x0][y0]) equal to 0 specifies that the MMVD mode is not used to generate the inter prediction parameters. The array indices x0 and y0 can specify a location (x0, y0) of a top-left luma sample of the considered coding block (e.g., the current CB) relative to a top-left luma sample of the picture (e.g., the current picture).

When the MMVD merge flag (e.g., mmvd_merge_flag [x0][y0]) is not present for the current CU, the MMVD merge flag (e.g., mmvd_merge_flag[x0][y0]) can be inferred to be equal to 0 for the current CU.

In some examples, MMVD flag is signaled right after sending a skip flag and merge flag. If skip and merge flag is true, MMVD flag is parsed. If MMVD flag is equal to 1, MMVD syntaxes are parsed. But, if MMVD flag is not 1, AFFINE flag is parsed in some examples. If AFFINE flag is equal to 1, AFFINE mode is used for decoding. But, if AFFINE flag is not 1, skip/merge index is parsed for VTM's skip/merge mode in some examples.

According to an aspect of the disclosure, template matching based candidate reordering can be performed on MMVD and Affine MMVD.

In some examples, MMVD offsets are extended to more positions for MMVD and affine MMVD modes.

Figure 10:
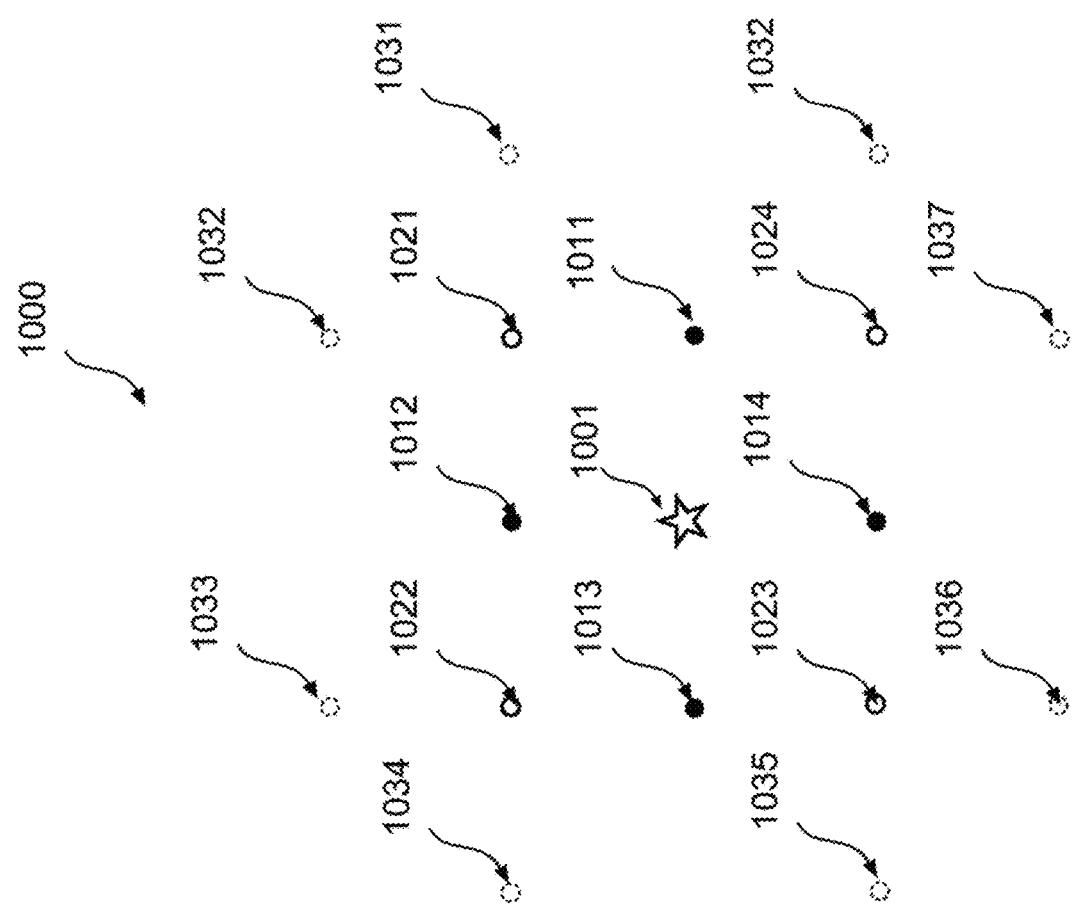
FIG. 10 shows a diagram illustrating refinement directions in some examples.

FIG. 10 shows a diagram illustrating directions in which refinement directions can be added for MMVD. In FIG. 10, additional refinement positions along k×π/8 diagonal angles are added, where k is an integer number. A position (1001) corresponds to a base candidate and can be a starting point, positions (1011)-(1014) are respectively in the directions of 0, π/2, π, and 3π/2. More directions are added. For example, positions (1021)-(1024) are respectively in the directions of π/4, 3π/4, and 5π/4, and 7π/4; and positions (1031)-(1038) are respectively in the directions of π/8, 3π/8, 5π/8, 7π/8, 9π/8, 11π/8, 13π/8, and 15π/8. Thus, the number of directions is increased from 4 to 16. Further, in an example, each direction can have 6 MMVD refinement positions. The total number of possible MMVD refinement positions is 16×6.

According to an aspect of the disclosure, SAD cost between the current template (e.g., one row above and one column left to the current block) and reference template can be calculated for each refinement position. Based on the SAD costs of the refinement positions, all the possible MMVD refinement positions (16×6) for each base candidate are reordered. Then, a top portion of the refinement positions, such as the top ⅛ refinement positions (e.g., 12), such as with the smallest template SAD costs are kept as available positions, consequently for MMVD index coding. The MMVD index is binarized by the rice code with the parameter equal to 2.

In some examples, refinement positions for affine MMVD can be increased, and template matching based candidate reordering can be applied for affine MMVD reordering. For example, affine MMVD refinement positions are in the directions along k×π/4 diagonal angles, such as in the 8 directions respectively of 0, π/4, π/2, 3π/4, π, 5π/4, 3π/2 and 7π/4. Each direction can have 6 affine MMVD refinement positions. The total number of possible affine MMVD refinement positions is 8×6. In an example, SAD cost between the current template (e.g., one row above and one column left to the current block) and reference template can be calculated for each refinement position. Based on the SAD costs of the refinement positions, all the possible affine MMVD refinement positions (8×6) for each base candidate are reordered. Then, a top portion of the refinement positions, such as the top ½ refinement positions (e.g., 24), such as with the smallest template SAD costs are kept as available positions, consequently for affine MMVD index coding.

To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. Each subblock of a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. In the second step, availability of an SbTMVP candidate can be checked and a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in the collocated picture for each subblock in the current CU that is in the current picture. If the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated picture can be used to improve MV prediction and a merge mode for CUs in the current picture. In an example, the same collocated picture used by the TMVP mode is used in the SbTVMP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated picture (e.g., the collocated block is the bottom-right or a center block relative to the current CU) while the SbTMVP mode can apply a motion shift before fetching the temporal motion information from the collocated picture. In an example, the motion shift used in the SbTMVP mode is obtained from an MV of one of spatial neighboring blocks of the current CU.

Figure 11:
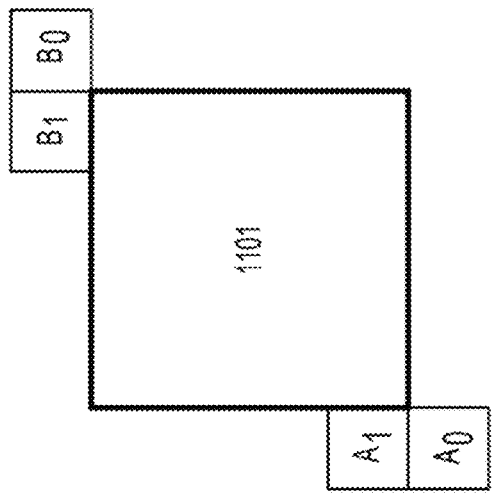
FIGS. 11-12 show an exemplary a subblock-based temporal motion vector prediction (SbTMVP) process in some examples.
Figure 12:
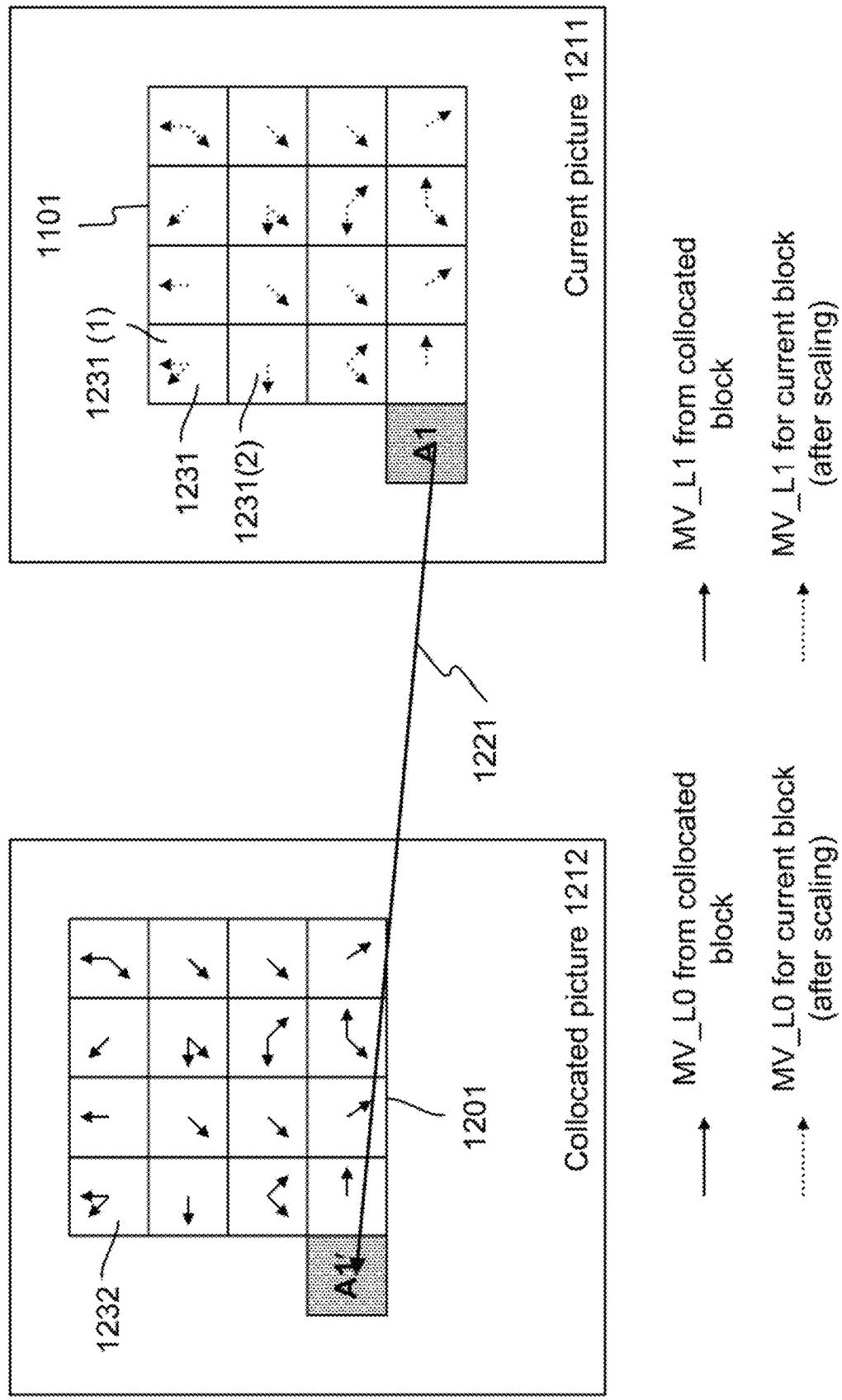

FIGS. 11-12 show an exemplary SbTMVP process used in the SbTMVP mode. The SbTMVP process can predict MVs of sub-CUs (e.g., subblocks) within a current CU (e.g., a current block) (1101) in a current picture (1211), for example, in two steps. In the first step, a spatial neighbor (e.g., A1) of the current block (1101) in FIGS. 11-12 is examined. If the spatial neighbor (e.g., A1) has an MV (1221) that uses a collocated picture (1212) as a reference picture of the spatial neighbor (e.g., A1), the MV (1221) can be selected to be a motion shift (or a DV) to be applied to the current block (1101). If no such MV (e.g., an MV that uses the collocated picture (1212) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (1221) identified in the first step can be applied to the current block (1101) (e.g., the DV (1221) is added to coordinates of the current block) to obtain sub-CU level motion information (e.g., including MVs and reference indices) from the collocated picture (1212). In the example shown in FIG. 12, the motion shift or the DV (1221) is set to be the MV of the spatial neighbor A1 (e.g., a block A1) of the current block (1101). For each sub-CU or subblock (1231) in the current block (1101), motion information of a corresponding collocated block (1201) (e.g., motion information of the smallest motion grid that covers a center sample of the collocated block (1201)) in the collocated picture (1212) can be used to derive the motion information for the sub-CU or subblock (1231). After the motion information of the collocated sub-CU (1232) in the collocated block (1201) is identified, the motion information of the collocated sub-CU (1232) can be converted to the motion information (e.g., MV(s) and one or more reference indices) of the current sub-CU (1231), for example, using a scaling method, such as in a similar way as the TMVP process used in HEVC, where temporal motion scaling is applied to align reference pictures of temporal MVs to reference pictures of a current CU.

The motion field of the current block (1101) derived based on the DV (1221) can include motion information of each subblock (1231) in the current block (1101), such as MV(s) and one or more associated reference indices. The motion field of the current block (1101) can also be referred to as an SbTMVP candidate and corresponds to the DV (1221).

FIG. 12 shows an example of the motion field or the SbTMVP candidate of the current block (1101). The motion information of the subblock (1231(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (1231(2)) that is uni-predicted includes an MV and an index indicating a reference picture in L0 or L1.

In an example, the DV (1221) is applied to a central position of the current block (1101) to locate a displaced central position in the collocated picture (1212). If a block including the displaced central position is not inter-coded, the SbTMVP candidate is considered not available. Otherwise, if a block (e.g., the collocated block (1201)) including the displaced central position is inter-coded, the motion information of the central position of the current block (1101), referred to as central motion of the current block (1101), can be derived from motion information of the block including the displaced central position in the collocated picture (1212). In an example, a scaling process can be used to derive the central motion of the current block (1101) from the motion information of the block including the displaced central position in the collocated picture (1212). When the SbTMVP candidate is available, the DV (1221) can be applied to find the corresponding subblock (1232) in the collocated picture (1212) for each subblock (1231) of the current block (1101). The motion information of the corresponding subblock (1232) can be used to derive the motion information of the subblock (1231) in the current block (1101), such as in the same way used to derive the central motion of the current block (1101). In an example, if the corresponding subblock (1232) is not inter-coded, the motion information of the current subblock (1231) is set to be the central motion of the current block (1101).

In some examples (e.g., VVC and ECM), a subblock based motion mode (also referred to as subblock based inter prediction mode), such as SbTMVP mode, affine mode and the like, codes (encodes/decodes) all subblocks in a coding block in the subblock based motion mode with inter prediction modes. According an aspect of the disclosure, due to the dynamic features of video content, not necessarily all subblocks in a coding block follow consistent motion model and some subblocks may be better coded with intra prediction modes, especially when different subblocks belong to different objects.

Some aspects of the disclosure provide techniques that allow one or more subblocks in a coding block that is coded in a subblock based motion mode to be coded in in an intra prediction mode.

According to an aspect of the disclosure, when a coding block is coded with a subblock based inter prediction mode (e.g., SbTMVP mode, affine mode, and the like), one or more of the subblocks in the coding block can be coded with intra prediction modes.

Figure 13:
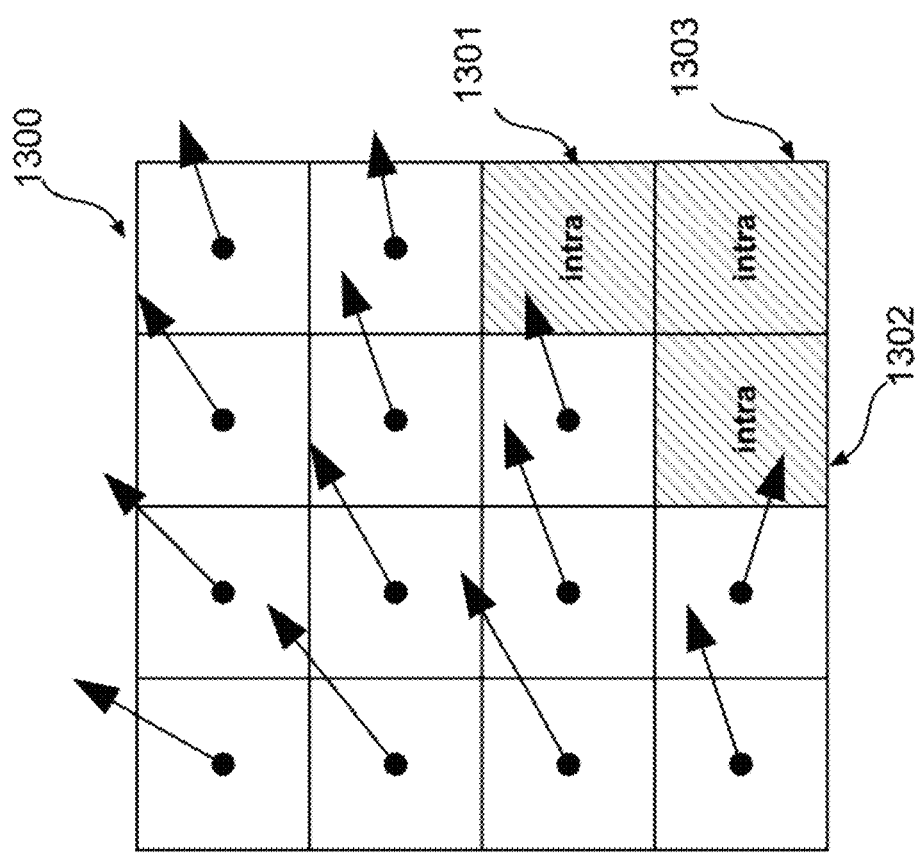
FIG. 13 shows a diagram of a coding block according to some embodiments of the disclosure.

FIG. 13 shows a diagram of a coding block (1300) according to some embodiments of the disclosure. The coding block (1300) is coded in a subblock based inter prediction mode. The coding block (1300) includes a plurality of subblocks, such as 16 subblocks as shown in FIG. 13. Among the 16 subblocks, 13 subblocks are coded with inter prediction modes, for example respectively based on motion vectors shown by arrows in FIG. 13; and three subblocks (1301)-(1303) are coded by intra prediction modes.

It is noted that the subblock based inter prediction mode can be any suitable subblock based inter prediction mode, such as affine mode affine, regression based inter prediction mode, SbTMVP mode, and the like. In some examples, the regression based inter prediction mode can derive motion vectors for subblocks in a coding block using motion vectors of neighboring subblocks based on linear regression.

In some embodiments, to determine whether a subblock in a coding block is coded by intra prediction mode, a first flag may be signaled or implicitly derived to indicate whether at least one subblock in the coding block is coded by intra prediction mode. For example, when the first flag is 0, all of the subblocks in the coding block are coded with inter prediction modes; and when the first flag is 1, at least one subblock in the coding block is coded with intra prediction mode.

In an embodiment, a second flag is signaled for each subblock to indicate whether the associated subblock is coded by intra prediction mode.

It is noted that the first flag can be implicitly derived without signaling in some examples. In an example, when a coding block is coded with SbTMVP mode, and there exists a subblock whose corresponding collocated block doesn't have a valid motion vector, the first flag is implicitly set as 1. In another example, when a coding block is coded with SbTMVP mode, and the corresponding collocated block of every subblock in the coding block has a valid motion vector, then the first flag is implicitly set as 0.

In an embodiment, the second flag is conditionally signaled for each subblock. For example, when a subblock does not have an associated motion vector in the motion vector field of a reference picture, the second flag is signaled to indicate whether the subblock is coded by intra prediction mode.

According to an aspect of the disclosure, when a coding block is coded in subblock based inter prediction mode and at least a subblock in the coding block is coded by intra prediction mode, then the subblocks coded by inter prediction mode are first reconstructed, then the remaining subblocks coded by intra prediction mode are reconstructed following a specific coding order.

In some examples, the specific coding order is determined by the positions of blocks which are coded by inter prediction modes.

In some examples, for a current subblock, the neighboring intra coded subblocks that are reconstructed prior to the current subblock, together with all the neighboring inter coded subblocks, can be used as the reference samples for the current subblock which is intra coded.

Figure 14:
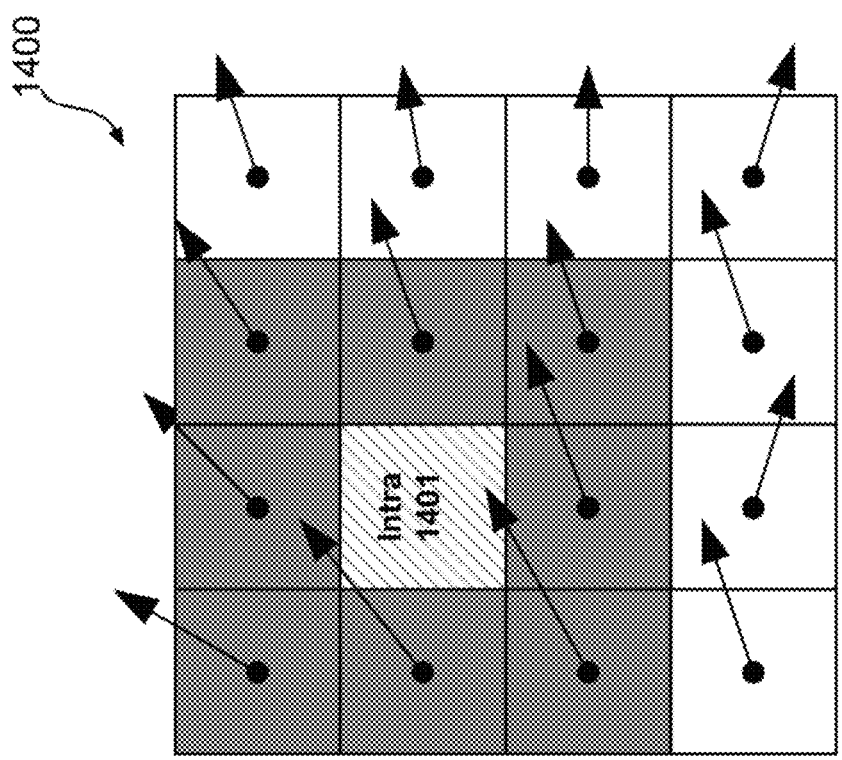
FIG. 14 shows a diagram of a coding block according to some embodiments of the disclosure.

FIG. 14 shows a diagram of a coding block (1400) according to some embodiments of the disclosure. The coding block (1400) is coded in a subblock based inter prediction mode, and includes a subblock (1401) that is intra coded. The subblock (1401) is surrounded by other subblocks that are inter coded (as shown by grey subblocks). The reconstruction of the grey subblocks can be used for the prediction of the subblock (1401) which is an intra coded subblock.

In some examples, an at_least_one_intra_flag (also referred to as the first flag in some examples) associated with a coding block is signaled to indicate whether at least one subblock in the coding block is coded by intra prediction mode. When the at_least_one_intra_flag is false, there is no subblock in the coding block being coded in intra prediction, the transform unit (TU) size is equal to coding unit (CU) size (coding block size). Otherwise (the at_least_one_intra_flag is true), the TU size is identical to the subblock size. Then, first one or more subblocks (in the coding block) that are coded by inter prediction mode are reconstructed firstly in raster scanning order, and then second one or more subblocks (in the coding block) that are coded by intra prediction mode are reconstructed in raster scanning order.

According to an aspect of the disclosure, when at least one subblock is coded by intra prediction mode, then the residual samples of all subblocks coded by inter prediction mode are put together and transform is applied on top of that, for those subblock positions which are intra coded, some residuals are filled to apply forward and inverse transform. In an example, any suitable values can be used to fill as residuals at the positions of the subblocks that are intra coded to form the transform unit.

According to an aspect of the disclosure, when at least one subblock is coded by intra prediction mode, each subblock that is intra coded, the prediction, transform and residual coding is done at the subblock level.

According to an aspect of the disclosure, when a subblock is coded by intra prediction mode, the available intra prediction modes may be selected from a limited set, such as the most probable modes (MPM), or selected smooth modes or non-directional modes. The smooth modes, such as smooth mode, smooth vertical mode and smooth horizontal mode can use linear interpolation to generate very smooth surfaces composed by filtered samples.

According to an aspect of the disclosure, when a subblock is coded by intra prediction mode, the intra prediction mode used for subblock prediction can be extended to use more available reference samples in addition to an above row and a left column. In some examples, one or more right columns of available references samples can be used in the intra prediction for the subblock. In some examples, one or more bottom rows of available references samples can be used in the intra prediction for the subblock. In some examples, corner samples neighboring to the subblock can be used in the intra prediction of the subblock. In some examples, multiple rows and/or multiple columns of reference samples may be used.

Figure 15:
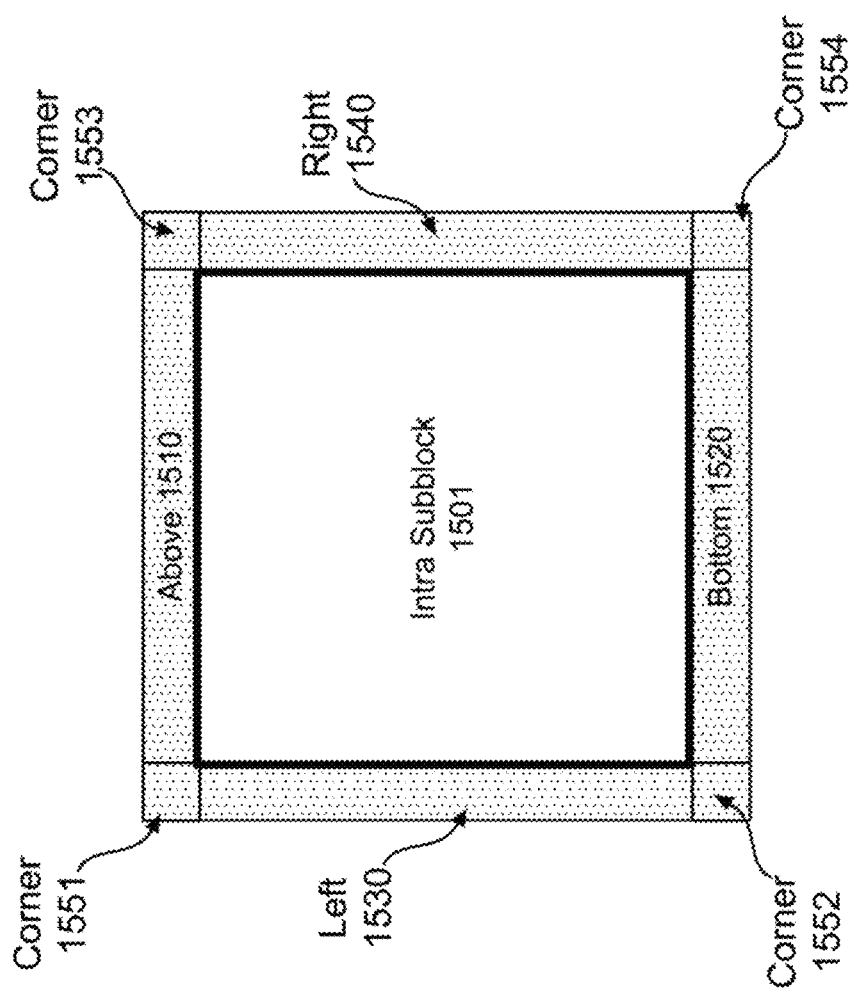
FIG. 15 shows a diagram of using intra prediction for a subblock according to some embodiments of the disclosure.

FIG. 15 shows a diagram of using intra prediction for a subblock (1501) according to some embodiments of the disclosure. The subblock (1501) is one of subblocks in a coding block (not shown), the coding block is coded with a subblock based inter prediction mode, and the subblock (1501) is coded in an intra prediction mode.

In some examples, the intra prediction mode used for subblock prediction of the subblock (1501) can be extended to use more available reference samples in addition to an above row (e.g., immediate above row in above rows (1510)) and a left column (e.g., immediate left column in left columns (1530)). In an example, multiple above rows (1510) of available reference samples can be used in the intra prediction of the subblock (1501). In another example, multiple above rows (1510) of available reference samples can be used in the intra prediction of the subblock (1501). In another example, one or more right columns in right columns (1540) of available reference samples can be used in the intra prediction for the subblock (1501). In another example, one or more bottom rows in bottom rows (1520) of available reference samples can be used in the intra prediction of the subblock (1501). In another example, corner samples neighboring to the subblock (1501), such as one or more available reference corner samples in corners (1551)-(1554) can be used in the intra prediction of the subblock (1501).

Figure 16:
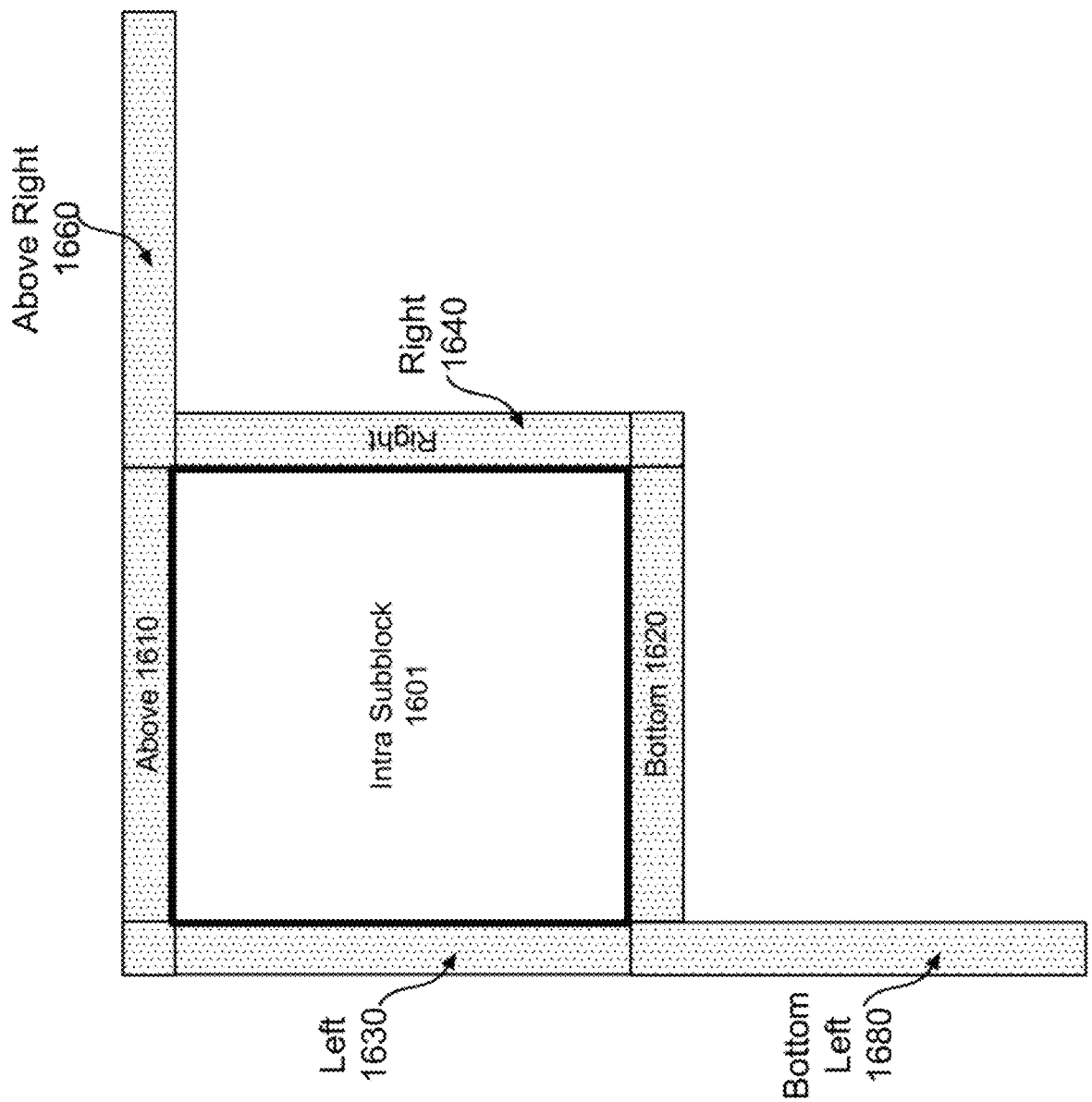
FIG. 16 shows a diagram of using intra prediction for a subblock according to some embodiments of the disclosure.

FIG. 16 shows a diagram of using intra prediction for a subblock (1601) according to some embodiments of the disclosure. The subblock (1601) is one of subblocks in a coding block (not shown), the coding block is coded with a subblock based inter prediction mode, and the subblock (1601) is coded in an intra prediction mode.

Similar to the example shown in FIG. 16, the intra prediction mode used for subblock prediction of the subblock (1601) can be extended to use more available reference samples in addition to an above row (e.g., immediate above row in above rows (1610)) and a left column (e.g., immediate left column in left columns (1630)). In some examples, one or more columns in bottom right columns (1680) of available reference samples can be used in the intra prediction of the subblock (1601). In some examples, one or more rows in above right rows (1660) of available reference samples can be used in the intra prediction of the subblock (1601).

In some examples, when a subblock in a coding block of a subblock based inter prediction mode is coded by intra prediction mode, then the luma component and chroma component of the subblock are both coded by intra prediction modes.

In some examples, when at least one subblock in a coding block of a subblock based inter prediction mode is coded by intra prediction mode, other subblocks coded with inter prediction mode may have constraints on the inter predictions to reduce computational complexity. In an example, the inter predictions are limited to be uni-prediction in order to reduce computational complexity According to an aspect of the disclosure, one or more predictors (e.g., for predicting the intra prediction modes) for the subblocks coded in intra prediction modes are determined from the neighboring pixels of the current coding unit (CU), such as the intra prediction process in VVC and ECM reference software. The supported intra prediction mode includes but not limited to most probable mode (MPM), decoder-side intra mode derivation (DIMD), template based intra mode derivation (TIMD), directional intra prediction modes and the like. In some examples, the predictors of the subblocks (e.g., first subblocks) coded in the intra prediction modes can be decoded in parallel with second subblocks coded in the inter prediction modes without any subblock level data dependency. The decoding of the second subblocks does not depend on the first subblock, and the decoding of the predictors of the first subblocks does not depend on the second subblocks.

Figure 17:
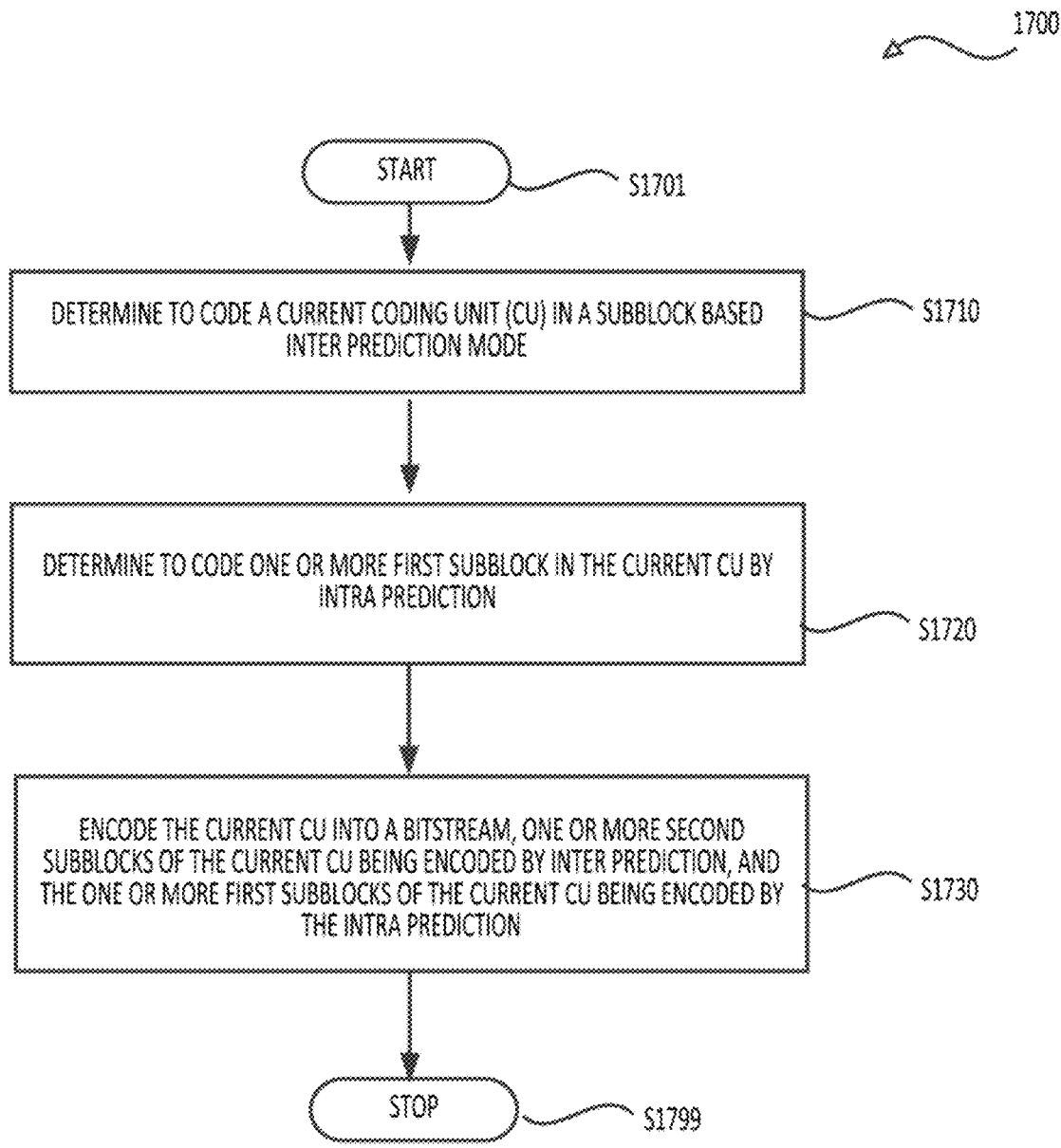
FIG. 17 shows a flow chart outlining a process according to some embodiment of the disclosure.

FIG. 17 shows a flow chart outlining a process (1700) according to an embodiment of the disclosure. The process (1700) can be used in a video encoder. In various embodiments, the process (1700) is executed by processing circuitry, such as the processing circuitry that performs functions of the video encoder (103), the processing circuitry that performs functions of the video encoder (303), and the like. In some embodiments, the process (1700) is implemented in software instructions, thus when the processing circuitry executes the software instructions, the processing circuitry performs the process (1700). The process starts at (S1701) and proceeds to (S1710).

At (S1710), a current coding unit (CU) in a picture is determined for coding in a subblock based inter prediction mode.

At (S1720), one or more first subblocks in the current CU are determined for coding by intra prediction.

At (S1730), the current CU is encoded into a bitstream, one or more second subblocks of the current CU are encoded by inter prediction, and the one or more first subblocks of the current CU are encoded by the intra prediction.

In some examples, the subblock based inter prediction mode can be any suitable inter prediction mode that encodes the CU at the subblock level. In an example, the subblock based inter prediction mode is affine mode. In another example, the subblock based inter prediction mode is a regression based inter prediction mode. In another example, the subblock based inter prediction mode is a subblock-based temporal motion vector prediction (SbTMVP) mode.

In some examples, a first flag is encoded in the bitstream, the first flag indicates at least one subblock in the current CU is coded by the intra prediction mode. Further, second flags are encoded in the bitstream, the second flags are respectively associated with subblocks in the current CU. A second flag associated with a subblock in the current CU indicates whether the subblock is coded by the intra prediction.

In some examples, the first flag is not encoded in the bitstream. In an example, the first flag is derived of a true value in response to a determination that a collocated block for a subblock in the current CU has no valid motion vector when the current CU is coded in a subblock-based temporal motion vector prediction (SbTMVP) mode. In another example, the first flag is derived of a false value in response to a determination that each subblock in the current CU has a valid motion vector when the current CU is coded in the SbTMVP mode.

In some examples, the one or more second subblocks of the current CU are reconstructed before the one or more first subblocks of the current CU, and the one or more first subblocks of the current block are reconstructed following a specific order that is determined based on positions of the one or more second subblocks. In an example, the one or more second subblocks of the current CU are reconstructed according to a raster scanning order, and the one or more first subblocks of the current CU are reconstructed according to the raster scanning order after the one or more second subblocks being reconstructed. In some examples, for a first subblock in the one or more first subblocks, the first subblock is reconstructed according to neighboring inter coded subblocks and neighboring intra coded subblocks in the current CU.

In some examples, a transform unit size of the current CU is determined to be a size of the subblock in response to the first flag being true, the first flag indicating whether at least one subblock in the current CU is coded by the intra prediction mode. In another example, the transform unit size is determined to be a size of the current CU in response to the first flag being false.

In some examples, when a subblock in the current CU is coded by intra prediction, then the residual samples of all subblocks (e.g., the second one or more subblocks) coded by inter prediction mode and padded residual samples of the first one or more subblocks are put together and transform is applied on top of that. For the first one or more subblocks that are intra coded, any suitable residual values can be used for padding to apply transform.

In some examples, when at least one subblock is coded by intra prediction mode, each subblock that is intra coded, the prediction, transform and residual coding is done at the subblock level.

In some examples, a first subblock in the one or more first subblocks is reconstructed based on an intra prediction mode that is selected from at least one of a set of most portable modes, as a set of selected smooth modes or a set of non-directional modes.

In some examples, a first subblock in the one or more first subblocks is reconstructed according to at least one of one or more right columns, one or more bottom rows, one or more corner samples, one or more above right rows, or one or more bottom left columns.

In an example, for an intra coded subblock in the one or more first subblocks by the intra prediction, both a luma component and at least a chroma component of the intra coded subblock are encoded by the intra prediction.

In some examples, in response to the one or more first subblocks in the current CU being coded by the intra prediction, constraints are applied to the inter prediction for reconstructing the one or more second subblocks. In an example, uni-prediction is used for the inter prediction, and bi-prediction cannot be used.

In some examples, a predictor of an intra prediction mode for the intra predication is determined from a neighboring pixel of the current CU. The intra prediction mode can be at one of a most probable mode (MPM), a decoder-side intra mode derivation (DIMD) mode, a template based intra mode derivation (TIMD) mode, or a directional intra prediction mode.

Then, the process proceeds to (S1799) and terminates.

The process (1700) can be suitably adapted. Step(s) in the process (1700) can be modified and/or omitted. Additional step(s) can be added. Any suitable order of implementation can be used.

Figure 18:
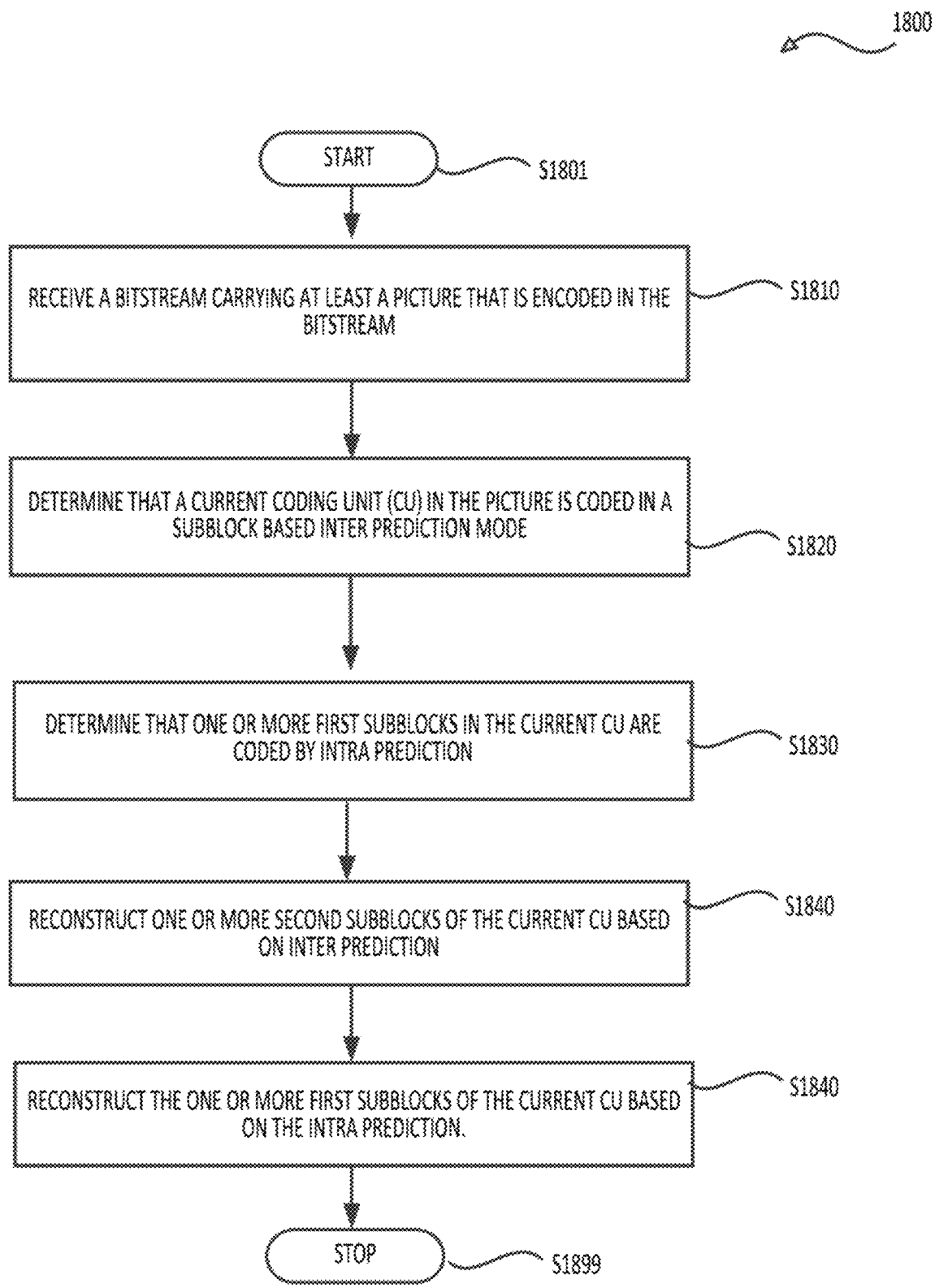
FIG. 18 shows a flow chart outlining another process according to some embodiment of the disclosure.

FIG. 18 shows a flow chart outlining a process (1800) according to an embodiment of the disclosure. The process (1800) can be used in a video decoder. In various embodiments, the process (1800) is executed by processing circuitry, such as the processing circuitry that performs functions of the video decoder (110), the processing circuitry that performs functions of the video decoder (210), and the like. In some embodiments, the process (1800) is implemented in software instructions, thus when the processing circuitry executes the software instructions, the processing circuitry performs the process (1800). The process starts at (S1801) and proceeds to (S1810).

At (S1810), a bitstream carrying at least a picture is received.

At (S1820), a current coding unit (CU) in the picture is determined being coded in a subblock based inter prediction mode.

At (S1830), one or more first subblocks in the current CU are determined being coded by intra prediction.

At (S1840), one or more second subblocks of the current CU are reconstructed based on inter prediction.

At (S1850), the one or more first subblocks of the current CU are reconstructed based on the intra prediction.

In some examples, the subblock based inter prediction mode includes at least one of an affine mode, a regression based inter prediction mode or a subblock-based temporal motion vector prediction (SbTMVP) mode.

In some examples, a first flag that indicates whether at least one subblock in the current CU is coded by the intra prediction is determined, and then second flags respectively associated with subblocks in the current CU are decoded from the bitstream, a second flag associated with a subblock in the current CU indicates whether the subblock being coded by the intra prediction. In an example, the first flag is decoded from the bitstream.

In some examples, the first flag is derived without signaling. In an example, the first flag is derived of a true value in response to a determination that a collocated block for a subblock in the current CU has no valid motion vector when the current CU is coded in a subblock-based temporal motion vector prediction (SbTMVP) mode. In another example, the first flag is derived of a false value in response to a determination that each subblock in the current CU has a valid motion vector when the current CU is coded in the SbTMVP mode.

In some examples, the one or more second subblocks of the current CU are reconstructed before the one or more first subblocks of the current CU, and the one or more first subblocks of the current CU are reconstructed following a specific order that is determined based on positions of the one or more second subblocks.

In an example, the one or more second subblocks of the current CU are reconstructed according to a raster scanning order, and the one or more first subblocks of the current CU are reconstructed according to the raster scanning order after the one or more second subblocks being reconstructed.

In some examples, for a first subblock in the one or more first subblocks, the first subblock is predicted according to neighboring inter coded subblocks and neighboring intra coded subblocks in the current CU.

In an example, a transform unit size is determined to be a size of subblocks in response to a first flag being true, the first flag indicates whether at least one subblock in the current CU is coded by the intra prediction. In another example, the transform unit size is determined to be a size of the current CU in response to the first flag being false.

In some examples, an inverse transform is performed to obtain a transform unit of a size of the current CU, residual values corresponding to the one or more second subblocks are determined according to the transform unit. Then, predicted one or more second subblocks based on inter prediction and the residual values are combined for the reconstruction of the one or more second subblocks.

In some examples, inverse transforms are obtained to obtain one or more transform units of a size of a subblock in the current CU, the one or more transform units respectively correspond to the one or more first subblocks. Residual values corresponding to the one or more first subblocks are determined according to the one or more transform units. Then, the predicted one or more first subblocks based on intra prediction and the residual values are combined for the reconstruction of the one or more first subblocks.

In some examples, a first subblock in the one or more first subblocks is reconstructed based on an intra prediction mode that is selected from at least one of a set of most portable modes, as a set of selected smooth modes or a set of non-directional modes.

In some examples, a first subblock in the one or more first subblocks is reconstructed according to at least one of one or more right columns, one or more bottom rows, one or more corner samples, one or more above right rows, or one or more bottom left columns.

In some examples, for each subblock in the one or more first subblocks, a luma component and chroma components of the subblock are both reconstructed by the intra prediction.

In some examples, in response to the one or more first subblocks in the current CU are coded by the intra prediction, the inter prediction is determined with constraints for reconstructing the one or more second subblocks. In an example, uni-prediction is used for the inter prediction.

In some examples, a predictor of an intra prediction mode is determined from a neighboring pixel of the current CU, the intra prediction mode includes at least one of a most probable mode (MPM), a decoder-side intra mode derivation (DIMD) mode, a template based intra mode derivation (TIMD) mode, or a directional intra prediction mode.

Then, the process proceeds to (S1899) and terminates.

The process (1800) can be suitably adapted. Step(s) in the process (1800) can be modified and/or omitted. Additional step(s) can be added. Any suitable order of implementation can be used.

The techniques described above, can be implemented as computer software using computer-readable instructions and physically stored in one or more computer-readable media. For example, FIG. 19 shows a computer system (1900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
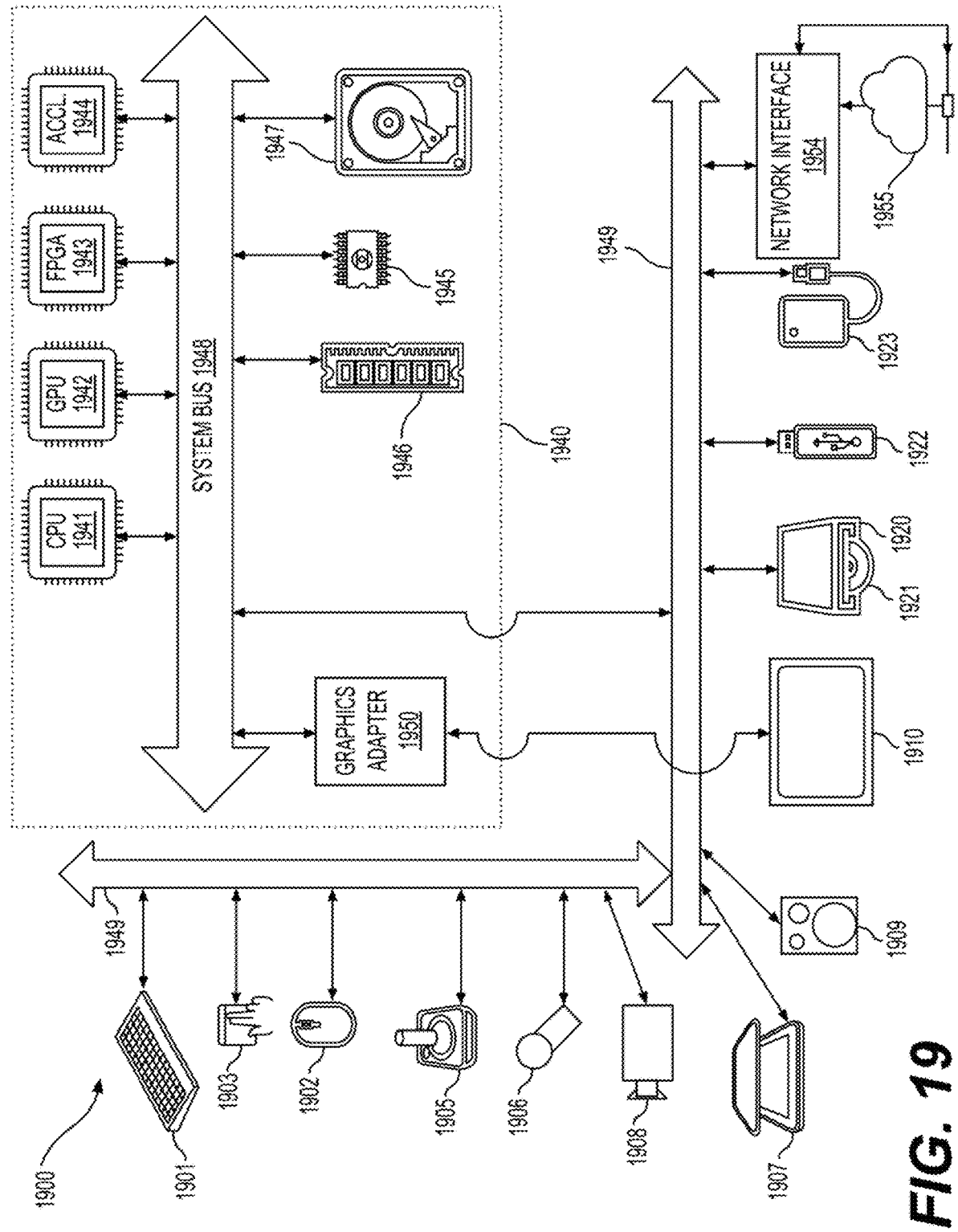
FIG. 19 is a schematic illustration of a computer system in accordance with an embodiment.

The components shown in FIG. 19 for computer system (1900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1900).

Computer system (1900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1901), mouse (1902), trackpad (1903), touch screen (1910), data-glove (not shown), joystick (1905), microphone (1906), scanner (1907), camera (1908).

Computer system (1900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1910), data-glove (not shown), or joystick (1905), but there can also be tactile feedback devices that do not serve as input devices), audio output devices (such as: speakers (1909), headphones (not depicted)), visual output devices (such as screens (1910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1900) can also include human accessible storage devices and their associated media such as optical media including CD/DVD ROM/RW (1920) with CD/DVD or the like media (1921), thumb-drive (1922), removable hard drive or solid state drive (1923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1900) can also include an interface (1954) to one or more communication networks (1955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1949) (such as, for example USB ports of the computer system (1900)); others are commonly integrated into the core of the computer system (1900) by attachment to a system bus as described below (for example Ethernet interface into a PC computer system or cellular network interface into a smartphone computer system). Using any of these networks, computer system (1900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1940) of the computer system (1900).

The core (1940) can include one or more Central Processing Units (CPU) (1941), Graphics Processing Units (GPU) (1942), specialized programmable processing units in the form of Field Programmable Gate Areas (FPGA) (1943), hardware accelerators for certain tasks (1944), graphics adapters (1950), and so forth. These devices, along with Read-only memory (ROM) (1945), Random-access memory (1946), internal mass storage such as internal non-user accessible hard drives, SSDs, and the like (1947), may be connected through a system bus (1948). In some computer systems, the system bus (1948) can be accessible in the form of one or more physical plugs to enable extensions by additional CPUs, GPU, and the like. The peripheral devices can be attached either directly to the core's system bus (1948), or through a peripheral bus (1949). In an example, the screen (1910) can be connected to the graphics adapter (1950). Architectures for a peripheral bus include PCI, USB, and the like.

CPUs (1941), GPUs (1942), FPGAs (1943), and accelerators (1944) can execute certain instructions that, in combination, can make up the aforementioned computer code. That computer code can be stored in ROM (1945) or RAM (1946). Transitional data can be also be stored in RAM (1946), whereas permanent data can be stored for example, in the internal mass storage (1947). Fast storage and retrieve to any of the memory devices can be enabled through the use of cache memory, that can be closely associated with one or more CPU (1941), GPU (1942), mass storage (1947), ROM (1945), RAM (1946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1900), and specifically the core (1940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1940) that are of non-transitory nature, such as core-internal mass storage (1947) or ROM (1945). The software implementing various embodiments of the present disclosure can be stored in such devices and executed by core (1940). A computer-readable medium can include one or more memory devices or chips, according to particular needs. The software can cause the core (1940) and specifically the processors therein (including CPU, GPU, FPGA, and the like) to execute particular processes or particular parts of particular processes described herein, including defining data structures stored in RAM (1946) and modifying such data structures according to the processes defined by the software. In addition or as an alternative, the computer system can provide functionality as a result of logic hard-wired or otherwise embodied in a circuit (for example: accelerator (1944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
    receiving a coded bitstream carrying at least a picture that includes a block comprising a plurality of subblocks;
    determining that a current coding unit (CU) in the picture is coded in a subblock based inter prediction mode based on a first syntax element value in the coded bitstream;
    determining that one or more first subblocks in the current CU that is coded in the subblock based inter prediction mode are coded by intra prediction;
    reconstructing one or more second subblocks of the current CU by inter prediction based on the subblock based inter prediction mode, wherein the one or more second subblocks do not overlap with the one or more first subblocks in the current CU; and
    reconstructing the one or more first subblocks of the current CU by the intra prediction while the current CU is coded in the subblock based inter prediction mode.

2. The method of claim 1, wherein the subblock based inter prediction mode comprises at least one of an affine mode, a regression based inter prediction mode or a subblock-based temporal motion vector prediction (SbTMVP) mode.

3. The method of claim 1, wherein the determining that the one or more first subblocks in the current CU are coded by the intra prediction comprises:
determining a first flag that indicates whether at least one subblock in the current CU is coded by the intra prediction; and
decoding, from the bitstream, second flags respectively associated with subblocks in the current CU, a second flag associated with a subblock in the current CU indicating whether the subblock being coded by the intra prediction.

4. The method of claim 3, wherein the determining the first flag further comprises:
decoding the first flag from the bitstream.

5. The method of claim 3, wherein the determining the first flag further comprises:
deriving that the first flag is of a true value in response to a determination that a collocated block for a subblock in the current CU has no valid motion vector when the current CU is coded in a subblock-based temporal motion vector prediction (SbTMVP) mode; or
deriving that the first flag is of a false value in response to a determination that each subblock in the current CU has a valid motion vector when the current CU is coded in the SbTMVP mode.

6. The method of claim 1, wherein the one or more second subblocks of the current CU are reconstructed before the one or more first subblocks of the current CU, and the one or more first subblocks of the current CU are reconstructed following a specific order that is determined based on positions of the one or more second subblocks.

7. The method of claim 1, further comprising:
reconstructing the one or more second subblocks of the current CU according to a raster scanning order; and
reconstructing the one or more first subblocks of the current CU according to the raster scanning order after the one or more second subblocks being reconstructed.

8. The method of claim 6, further comprising:
for a first subblock in the one or more first subblocks, reconstructing the first subblock according to neighboring inter coded subblocks and neighboring intra coded subblocks in the current CU.

9. The method of claim 1, further comprising:
determining a transform unit size to be a size of subblocks in response to a first flag being true, the first flag indicating whether at least one subblock in the current CU is coded by the intra prediction; and
determining the transform unit size to be a size of the current CU in response to the first flag being false.

10. The method of claim 1, further comprising:
performing an inverse transform to obtain a transform unit of a size of the current CU; and
determining residual values corresponding to the one or more second subblocks according to the transform unit.

11. The method of claim 1, further comprising:
performing inverse transforms to obtain one or more transform units of a size of a subblock in the current CU, the one or more transform units respectively corresponding to the one or more first subblocks; and
determining residual values corresponding to the one or more first subblocks according to the one or more transform units.

12. The method of claim 1, wherein the reconstructing the one or more first subblocks further comprises:
reconstructing a first subblock in the one or more first subblocks based on an intra prediction mode that is selected from at least one of a set of most portable modes, as a set of selected smooth modes or a set of non-directional modes.

13. The method of claim 1, wherein the reconstructing the one or more first subblocks further comprises:
reconstructing a first subblock in the one or more first subblocks according to at least one of one or more right columns, one or more bottom rows, one or more corner samples, one or more above right rows, or one or more bottom left columns.

14. The method of claim 1, wherein the reconstructing the one or more first subblocks further comprises:
reconstructing a luma component and at least a chroma component of a subblock in the one or more first subblocks by the intra prediction.

15. The method of claim 1, wherein the reconstructing the one or more first subblocks further comprises:
in response to the one or more first subblocks in the current CU are coded by the intra prediction, determining the inter prediction with constraints for reconstructing the one or more second subblocks.

16. The method of claim 15, wherein the determining the inter prediction further comprises:
determining to use uni-prediction for the inter prediction.

17. The method of claim 1, wherein the reconstructing the one or more first subblocks further comprises:
determining a predictor of an intra prediction mode from a neighboring pixel of the current CU, the intra prediction mode including at least one of a most probable mode (MPM), a decoder-side intra mode derivation (DIMD) mode, a template based intra mode derivation (TIMD) mode, or a directional intra prediction mode.

18. An apparatus of video processing, comprising processing circuitry configured to:
receive a coded bitstream carrying at least a picture that includes a block comprising a plurality of subblocks;
determine that a current coding unit (CU) in the picture is coded in a subblock based inter prediction mode based on a first syntax element value in the coded bitstream;
determine that one or more first subblocks in the current CU that is coded in the subblock based inter prediction mode are coded by intra prediction;
reconstruct one or more second subblocks of the current CU by inter prediction based on the subblock based inter prediction mode, wherein the one or more second subblocks do not overlap with the one or more first subblocks in the current CU; and
reconstruct the one or more first subblocks of the current CU by the intra prediction while the current CU is coded in the subblock based inter prediction mode.

19. The apparatus of claim 18, wherein the subblock based inter prediction mode comprises at least one of an affine mode, a regression based inter prediction mode or a subblock-based temporal motion vector prediction (SbTMVP) mode.

20. The apparatus of claim 18, wherein the processing circuitry is further configured to:
determine a first flag that indicates whether at least one subblock in the current CU is coded by the intra prediction; and
decode, from the bitstream, second flags respectively associated with subblocks in the current CU, a second flag associated with a subblock in the current CU indicating whether the subblock being coded by the intra prediction.

* * * * *